United States Patent Office

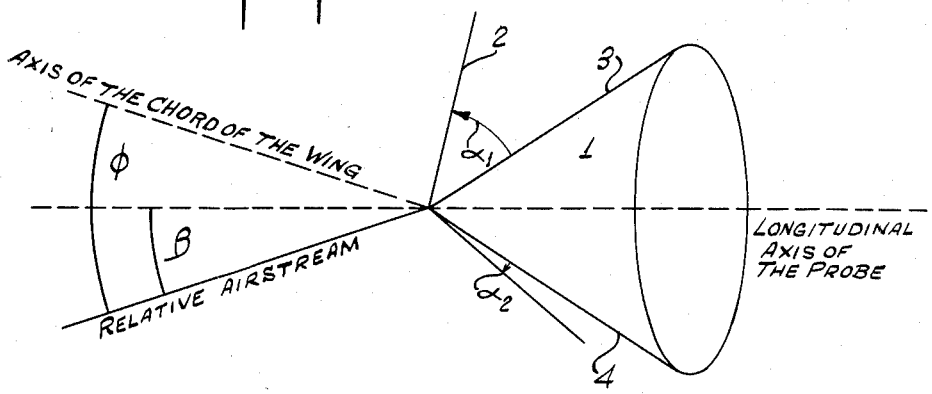
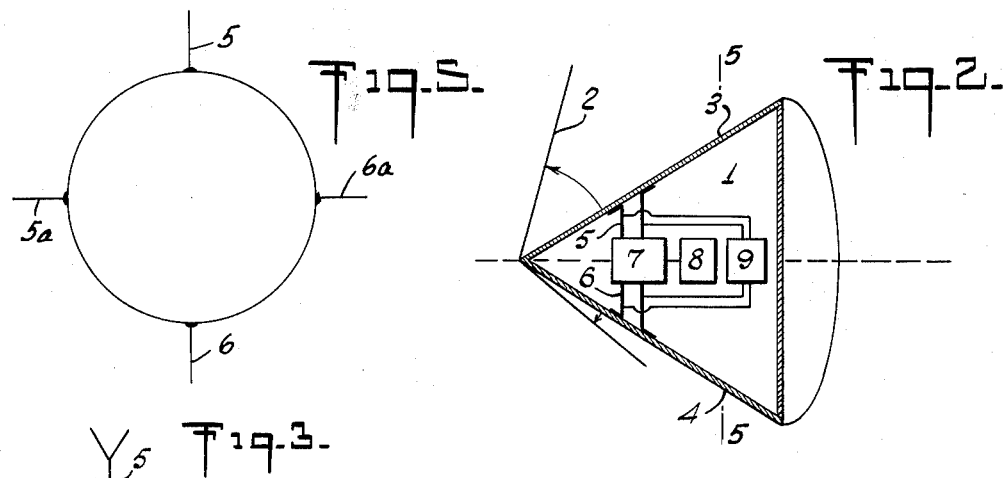
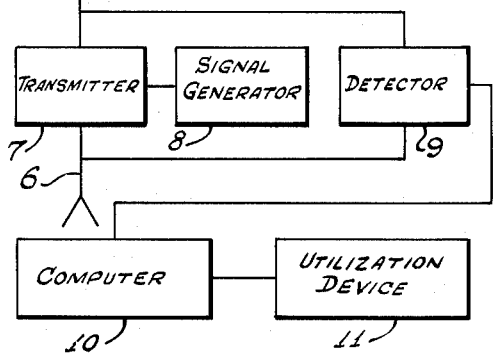
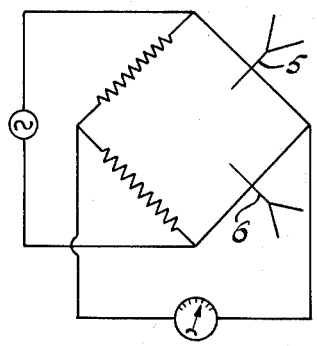
INVENTOR
GEORG E. KNAUSENBERGER

3,234,789
Patented Feb. 15, 1966

3,234,789
ELECTROMAGNETIC PROBE FOR DETERMINING THE ATTITUDE OF A PLANE IN FLIGHT
Georg E. Knausenberger, State College, Pa., assignor to HRB-Singer, Inc., State College, Pa., a corporation of Delaware
Filed Nov. 19, 1959, Ser. No. 854,033
9 Claims. (Cl. 73—180)

This invention relates generally to a device for determining the attitude of flight of an air vehicle, for example, the angles of pitch and yaw and, more particularly, it relates to an electromagnetic probe for determining these angles.

It has been found necessary to control the flight attitude with respect to the axis of the relative airstream. As a result, devices have been proposed which utilize the airstream to indicate the angles of yaw and pitch and thus to effect a control over the air vehicle.

Such devices which rely on the determination of the yaw and pitch angles by utilizing the axis of the relative airstream are generally of the pitot tube or mechanical vane types. In such devices, a vane or an array of pitot tubes is positioned in the airstream to provide the information necessary for the determination of the values of pitch and yaw. While these devices have operated satisfactorily, they have been affected by inclement conditions of weather, such as dust or icing. Further, they become less accurate as the speed of flight increases.

This invention has as its main object the elimination of such disadvantages by the provision of a static device, which relies on the position of the relative airstream with respect to the position of the air vehicle for ascertaining the angles of attack in pitch and yaw, but, which will not be affected by atmospheric or flight conditions. In addition, the proposed device has the advantage of providing increased effectiveness as the speed of the air vehicle increases, particularly in the range of supersonic speeds at which modern aircraft travel.

In accordance with the invention, there is provided a probe having an axis disposed parallel to the longitudinal axis of the aircraft. A pair of radiating antennas fed from a very high frequency (VHF) transmission source are provided on the surface of the probe.

To measure pitch angles, the antennas are situated on opposing sides of the probe in a vertical plane, and to measure yaw angles the antennas are situated on opposing sides of the probe in a horizontal plane. To simultaneously measure pitch and yaw angles, two pairs of antennas are used, one pair being disposed in a vertical plane and the other in a horizontal plane.

In flight, the apex of the probe would also be the apex of a shock wave cone that would diverge from the surface of the probe; the shock wave constituting an abrupt change in the medium. The VHF energy is radiated from the antennas, which may be arranged in pairs, in vertical and horizontal planes, at diametrically opposite points on the surface of the probe. The radiated energy strikes the shock wave and some of it is reflected back to interfere with the transmitted energy. The relative values of interference of the pair of antennas is detected to determine the relative positions of the antennas from the shock wave and the angles of pitch and yaw which are functions of these distances.

The above-mentioned and other features and objects of this invention and the manner of attaining them will become more apparent and the invention itself will be best understood by reference to the following description of an embodiment of the invention taken in conjunction with the accompanying drawings, wherein:

FIGURE 1 is a schematic representation of a conical probe in side elevation, according to the present invention and illustrating the angular relationship for the angle of attack;

FIGURE 2 is a sectional view of FIGURE 1 and shows the electromagnetic means mounted in the probe for ascertaining the angle of attack;

FIGURE 3 is a simplified block diagram showing an electrical system utilizing the electromagnetic probe of this invention;

FIGURE 4 is a simplified wiring diagram of the detector circuit shown in FIGURE 3; and FIGURE 5 is a view taken along the line 5—5 of FIGURE 2, showing the location of antennas mounted on the probe.

It is, of course, known that as an aircraft or missile travels through the atmosphere, an abrupt change occurs in the airstream striking the vehicle and a pressure front is formed forwardly of the vehicle; such a pressure front being more commonly referred to as a shock wave. In FIGURE 1 a pressure front is depicted, by reference numeral 2, as being formed by a conical probe 1 which is suitably carried by an aircraft or other space vehicle for which it is desired to measure the angles of attitude of the vehicle when in flight. In FIGURES 1 and 2, the shock fronts lie approximately symmetrical to the inflow. The shock wave, which is generated by the forwardmost part of the probe, will be constant for a particular set of aerodynamic conditions and for a particular configuration of the probe, which, in this embodiment, is shown as being conical in shape, and, therefore, the shock wave will be fixed regardless of any change of orientation of the probe resulting from a change in attitude of flight of the vehicle. The axis of the probe 1 is shown in FIGURE 1 as being horizontal and thus the angles $\alpha 1$ and $\alpha 2$ are formed between the shock wave 2 and the upper and lower sides 3 and 4, respectively, of the probe 1. It is the relative relationship of these angles to each other which is utilized to indicate that aspect of flight performance known as angle of attack or pitch angle.

The angle of attack of an air vehicle is the angle between the axis of the chord of the wing and the relative airstream encountered by the aircraft in flight, or, as more particularly denoted in FIGURE 1, the angle $\phi$. The angle $\beta$ is shown as being the angle between the longitudinal axis of the probe 1 and the relative airstream. The disposition of the probe 1 with respect to the shock wave will, of course, be dependent on the angle of attack. Therefore, if it is assumed that the axis of the chord of the wing is the same as the longitudinal axis of the probe, the angle $\beta$ will be the actual angle of attack and will be a function of the relative relationship of angle $\alpha 1$ to angle $\alpha 2$.

If the angles $\alpha 1$ and $\alpha 2$ are equal then the axis of the probe will coincide with the axis of the airstream and the angle $\beta$ will be zero. On the other hand, if the angles are unequal, there will be an angle of inclination or declination with respect to the axis of the probe and, therefore, an indication will be provided that the air vehicle is pitching with respect to its velocity vector If the axis of the chord of the wing does not coincide with the longitudinal axis of the probe, the angle between them will be known, or measurable, and the angle of attack $\phi$ can thus be readily computed from the geometric arrangement and the measured angle B.

These physical principles are utilized in the embodiment depicted in FIGURE 2, wherein, means are provided for measuring electrical parameters which may thereafter be converted to a value of the angle of attack. Radiating antennas 5 and 6 of the dipole type are depicted as being surface mounted on a vertical plane through the axis of the cone at diametrically opposite points 3 and 4 on the probe surface. These antennas radiate very high frequency energy in a continuous manner, as fed from a suitable transmitter 7 connected to a signal generator 8 (FIG. 3).

The radiated energy from the antennas 5 and 6 strikes the shock wave 2 and is scattered in random directions from the shock wave as a consequence of the abrupt atmospheric change in the airstream which causes this shock wave. The effect is that certain of the transmitted energy will be reflected back to the antennas 5 and 6 and interferes with the radiated energy; or, in other words, interferes with the impedance characteristic of the antennas. It is this impedance which is measured at the antennas to obtain the value of the angle of attack.

At the higher Mach numbers, ionization and electronic excitation of the radiated energy occurs, resulting in greater interference with the transmitted energy. It is observed, therefore, that as the velocity of the vehicle increases, the excitation of the radiation increases, causing a greater degree of interference in the impedance characteristics of the transmitted energy, which results in an increased accuracy of measurement.

The change in antenna impedance, caused by the interference of the transmitted energy, is detected in a detector circuit 9, which is shown in block form in FIGURE 3, and in FIGURE 4, as a simple bridge circuit. This change is directly related to the angular distance between the surface of the probe and the shock wave, that is, the impedance change will increase as the angular distance decreases. Therefore, by making a comparative measurement of the impedance changes of the transmissions from the two antennas, a relative determination of the angles $\alpha 1$ and $\alpha 2$ will be obtained. This follows because the sum of these angles is constant for a given set of areodynamic conditions regardless of any change in orientation of the probe resulting from a change in the pitch of the air vehicle.

As previously stated, when the angles $\alpha 1$ and $\alpha 2$ are equal, a zero pitch angle is obtained since the axis of the probe will coincide with the axis of the shock wave. When the impedance change at one antenna is greater than at the second, the angles $\alpha 1$ and $\alpha 2$ will be unequal and a value of the angle of attack may be obtained.

Referring again to FIGURE 3, if the comparative measurement of the changes in antenna impedance at the antennas 5 and 6 as detected by detector circuit 9, is fed to a suitable computer circuit, such as that shown in block form by the reference numeral 10, along with other data which is known, the value of the pitch angle of the air vehicle may be obtained. This information may be displayed directly in the cockpit of a manned aircraft for the information of the pilot or it may provide a control signal for the pitch control unit of an automatic pilot in a missile or aircraft, or it may be converted to another parameter of flight performance, such as vehicle velocity or Mach number. This aspect of operation has been shown in block form as a utilization device 11.

The foregoing description has been confined to means for ascertaining the value of the pitch angle of an air vehicle by measuring certain electrical parameters of radiant energy which emanates from dipole type antennas in continuous wave manner. It is to be understood that the invention is not so limited. For example, other types of antennas may be used to transmit the VHF energy, such as slot antennas, which are fed from suitable waveguide structure, and mounted on the surface of the probe to transmit the VHF energy.

In addition, an alternative method of transmission may provide for varying the frequency of the transmitted wave and maintaining the shock wave fixed; that is, by operating the antennas at various frequencies and measuring the antenna feed current. The maxima and minima are detected and utilized to render a precise determination of the relative distances of the antennas from the shock wave and thus of the angle of attack.

A second alternative method would provide for utilizing pulsed signals in the energy transmissions, so that the time of travel of the transmitted and reflected waves could be detected from the antennas on opposite sides of the probe to render the relative values of distance and again, the angle of attack of the vehicle.

Furthermore, the yaw component of flight may be determined by using the same type of system. The radiating antennas for this measurement would be mounted on a horizontal plane through the center of the probe, 180° apart. This arrangement is shown by the antennas 5a and 6a in FIG. 5. The yaw angle would be dependent on the relative values of the angular distance between the probe and the shock wave on this horizontal plane.

This invention further contemplates the simultaneous measurement of both the pitch and yaw angles of an air vehicle when in flight. This is accomplished by providing radiating antennas on the surface of the probe at 90° intervals on horizontal and vertical planes through the center of the probe as illustrated in FIG. 5. Independent detecting circuits would be used to provide relative measurements of the information necessary for ascertaining the pitch angle and the yaw angle.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A device for determining the attitude of an aircraft in flight comprising a probe, a first radiating antenna disposed on one side of said probe, a second radiating antenna disposed on a side of said probe diametrically opposite to said first antenna, means for generating a high frequency wave and radiating the energy thereof from said antennas, and means for comparing the radiation resistance of said first antenna to the radiation resistance of said second antenna.

2. An angle of attack device comprising a probe having a top and a bottom surface, a first radiating antenna mounted on the top surface thereof and a second radiating antenna mounted on the bottom surface thereof, means for generating a high frequency wave and transmitting the energy thereof to said antennas, and comparison means for comparing the radiation resistance of said first antennat to the radiation resistance of said second antenna, said comparison means being operable to produce an output signal corresponding to the difference between said two radiation resistances.

3. A device for determining the yaw of an aircraft in flight comprising a probe having two opposing side surfaces, a first radiating antenna mounted on one side surface thereof and a second radiating antenna mounted on the other side surface of the probe diametrically opposite to said first antenna, means for generating a high frequency wave and transmitting the energy thereof to said antennas, and comparison means for comparing the radiation resistance of said first antenna to the radiation resistance of said second antenna, said comparison means being operable to produce an output signal corresponding to the difference between said two radiation resistances.

4. A device for determining the angle of attack and the yaw of an aircraft in flight comprising a probe having a top surface, a bottom surface, and two opposing side surfaces, a first radiating antenna disposed on the top surface of said probe, a second radiating antenna disposed on the bottom surface of said probe diametrically opposite to said first antenna, a third radiating antenna disposed on one side surface of said probe, a fourth radiating antenna disposed on the other side of said probe diametrically opposed to said third antenna, means for generating a high frequency wave to be radiated from said antennas, first comparison means for comparing the radiation resistance of said first antenna with the radiation resistance of said second antenna, and second comparison means for comparing the radiation resistance of said third antenna with the radiation resistance of said fourth antenna, said first and second comparison means each being operable to produce an output signal corresponding to the difference between their respective radiation resistances.

5. In a device for determining the attitude of an aircraft in flight the improvement comprising a probe member mounted on the aircraft, said probe member having two opposing surfaces that meet at a relatively pointed apex, the apex thereof being directed toward the front end of said aircraft, and the surfaces thereof being exposed to the atmosphere; a first radiating antenna mounted on one of said probe surfaces, said first radiating antenna being adapted to radiate radio-frequency energy outwardly from said first surface; a second radiating antenna mounted on the other probe surface, said second radiating antenna being adapted to radiate radio-frequency energy outwardly from said second surface; transmitter means coupled to said first and second antennas, said transmitter means being operable to apply radio-frequency signals to said first and second antennas; resistance comparison means coupled to said first and second antennas, said resistance comparison means being operable to compare the radiation resistances of said antennas and to produce an output signal corresponding to the difference between said two radiation resistances.

6. The combination defined in claim 5 wherein said first and second antennas are located in a vertical plane with respect to said aircraft whereby said output signal of said comparison means is a function of the pitch angle of said aircraft.

7. The combination defined in claim 5 wherein said first and second antennas are located in a horizontal plane with respect to said aircraft whereby said output signal of said comparison means is a function of the yaw angle of said aircraft.

8. The combination defined in claim 5 and also including indicator means coupled to the output signal of said comparison means.

9. In a pitch and yaw angle transducer for determining the pitch angle and yaw angle of an aircraft in flight the improvement comprising a probe member mounted on the aircraft, said probe member having an upper surface, a lower surface, and two opposing side surfaces, said surfaces meeting at a relatively pointed apex, said apex being directed toward the front end of said aircraft, and the surfaces thereof being exposed to the atmosphere; a first radiating antenna mounted on the lower surface of said probe member, a second radiating antenna mounted on the upper surface of said probe member, a third radiating antenna mounted on one side surface of said probe member, a fourth radiating antenna mounted on the other side surface of said probe member, and each of said antennas being adapted to radiate radio-frequency energy outwardly from their respective surfaces; transmitter means coupled to each of said antennas, said transmitter means being operable to apply radio-frequency signals to each of said antennas; first resistance comparison means coupled to said first and second antennas, said resistance comparison means being operable to compare the radiation resistances of said first and second antennas and to produce a first output signal corresponding to the difference thereinbetween; second resistance comparison means coupled to said third and fourth antennas, said second resistance comparison means being operable to compare the radiation resistances of said third and fourth antennas and to produce a second output signal corresponding to the difference thereinbetween.

References Cited by the Examiner
UNITED STATES PATENTS 2,937,808   5/1960   Newell _____ 73—180 X LOUIS R. PRINCE, *Primary Examiner.*

SAMUEL FEINBERG, SAMUEL BOYD, *Examiners.*